(12) United States Patent
Hanagan

(10) Patent No.: US 6,641,196 B1
(45) Date of Patent: Nov. 4, 2003

(54) ADJUSTABLE FAIRING FOR VEHICLE

(75) Inventor: Michael W. Hanagan, Hollister, CA (US)

(73) Assignee: Corbin Pacific, Inc., Hollister, CA (US)

( * ) Notice: Subject to any disclaimer, the term of this patent is extended or adjusted under 35 U.S.C. 154(b) by 0 days.

(21) Appl. No.: 10/193,379

(22) Filed: Jul. 11, 2002

(51) Int. Cl.[7] .................................... B62J 17/04
(52) U.S. Cl. ......................... 296/78.1; 296/180.5
(58) Field of Search ..................... 296/180.1, 180.3, 296/180.5, 92, 78.1, 84.1

(56) References Cited

U.S. PATENT DOCUMENTS

| | | | |
|---|---|---|---|
| 891,537 A | 6/1908 | Graff | |
| 1,023,901 A | 4/1912 | Webster | |
| 1,027,528 A | 5/1912 | Douglas | |
| 1,037,604 A | 9/1912 | Douglas | |
| 1,050,944 A * | 1/1913 | Inshaw | 296/92 |
| 4,166,650 A | 9/1979 | Saunders, IV | |
| 4,479,663 A * | 10/1984 | Morris et al. | 296/78.1 |
| 4,606,571 A | 8/1986 | Fujita | |
| 4,696,509 A * | 9/1987 | Yagasaki et al. | 296/96.21 |
| 4,707,017 A * | 11/1987 | Minobe et al. | 296/78.1 |
| 4,830,423 A | 5/1989 | Nebu et al. | |
| 5,730,483 A * | 3/1998 | Greger | 296/78.1 |
| 5,732,965 A | 3/1998 | Willey | |
| 5,855,404 A | 1/1999 | Saunders | |
| 5,876,088 A | 3/1999 | Spears | |
| 6,293,606 B1 * | 9/2001 | Jarosz et al. | 296/78.1 |

FOREIGN PATENT DOCUMENTS

| | | | | |
|---|---|---|---|---|
| DE | 3609595 A1 * | 9/1987 | | B62K/27/16 |
| GB | 0197955 | * | 8/1924 | 296/78.1 |
| IT | 4965667 | * | 7/1954 | 296/78.1 |
| JP | 5-254470 A | * | 10/1993 | 296/78.1 |

* cited by examiner

*Primary Examiner*—Stephen T. Gordon
*Assistant Examiner*—Patricia L. Engle

(57) ABSTRACT

An adjustable fairing for a motorcycle has a fairing body, a pivot assembly for mounting the fairing body on the vehicle, and an adjustment knob operative on the pivoting assembly for adjusting the angle of the fairing body while the motorcycle is in operation.

15 Claims, 5 Drawing Sheets

ADJUSTABLE FAIRING FOR VEHICLE

BACKGROUND OF THE INVENTION

The present invention relates to fairings for motorcycles and the like, and, more particularly, to a fairing that can be adjusted as to its orientation, while the vehicle is being operated.

Fairings are used on the front of open vehicles such as motorcycles and motor scooters to control air flow over the vehicle and driver. When the fairing is in a low position, air flow lines are straighter and more horizontal than when the fairing is in a high position. As cross winds, head winds and temperatures change, the driver may wish to change the height of the fairing to control the air flow about the motorcycle.

It is an object of the invention to provide a novel fairing which can be easily and conveniently adjusted by the driver during operation of the vehicle to control the air flow about the vehicle and driver.

It is also an object to provide such a fairing which can be adjusted rapidly and with a single hand.

Another object is to provide such a fairing which may be fabricated readily from relatively few parts.

A further object is to provide such a fairing which has a configuration that is consistent with the overall aerodynamic design of the vehicle.

A still further object is to provide a motorcycle assembled with such a fairing.

SUMMARY OF THE INVENTION

It has now been found that the foregoing and related objects may be readily attained in an adjustable fairing for a motorcycle which comprises a fairing body, mounting means for mounting the fairing body on the vehicle, and manually rotatable adjustment means for easily adjusting the position of the fairing body while the motorcycle is in operation.

Desirably, the manually operated rotation means comprises a rotatable knob, and the mounting means includes pivot means to move the fairing body between an upper operating position and a lower operating position and positions in between. Preferably, the manually operated rotation means fixes the fairing body in a desired adjusted position. The fairing body has a generally arcuate cross section vertically and horizontally, and desirably has an upper edge which curves forwardly. Another preferred form of the invention is an adjustable fairing for a motorcycle having a frame, a driver's seat thereon and a handlebar. The fairing comprises a fairing body, mounting means pivotably mounting the fairing body on the frame forwardly of the handlebar, and manually rotatable adjustment means operative on the mounting means to pivot the fairing body to adjust the angle of the fairing body relative to the frame while the motorcycle is in operation.

DETAILED DESCRIPTION OF THE PREFERRED EMBODIMENT

Figure 1:
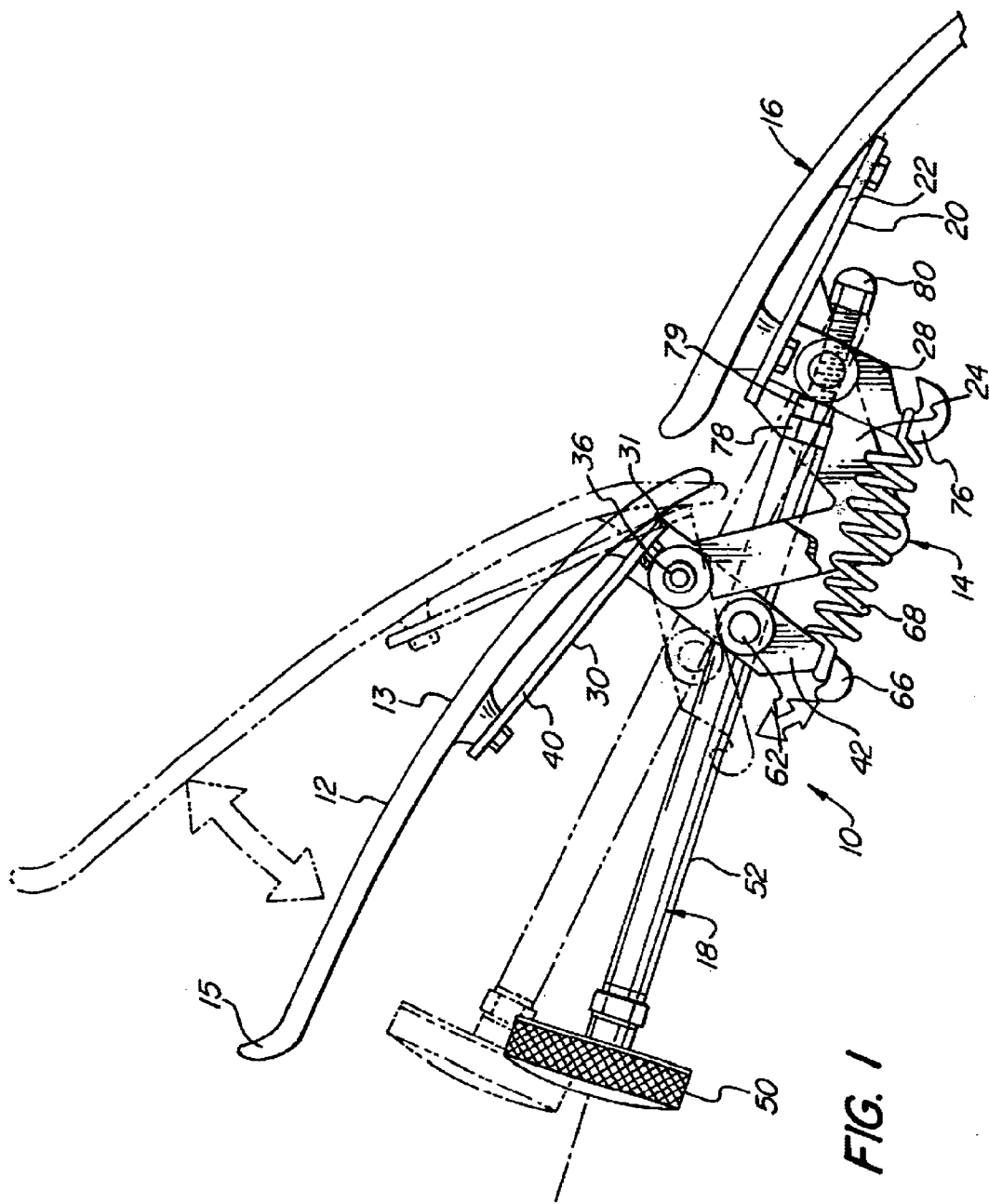
FIG. 1 is a side elevational view of an adjustable fairing assembly embodying the present invention as mounted upon a fragmentarily illustrated motorcycle frame, the fairing being shown in full line in the lower operating position and phantom line in the upper operating position.

Turning first to FIG. 1 of the attached drawings, therein illustrated is an adjustable fairing assembly embodying the present invention and generally designated by the numeral 10. The fairing assembly 10 is comprised of a fairing body generally designated by the numeral 12, a pivot assembly generally designated by the numeral 14, and an adjusting knob assembly generally designated by the numeral 18. The pivot assembly 14 supports the fairing body 12 on the motorcycle frame 16.

The fairing body 12 has a generally arcuate cross section both horizontally and vertically to provide a slightly convex outer surface 13. The upper edge portion 15 is reversely curved to extend upwardly and forwardly to direct air flow above the motorcycle and driver. The pivotal angle of the fairing body 12 relative to the motorcycle frame 16 is adjusted by adjusting the knob assembly 18. During pivoting, the lower end of the fairing body 12 remains adjacent to, and slightly below, the upper end of the frame 16.

Figure 2:
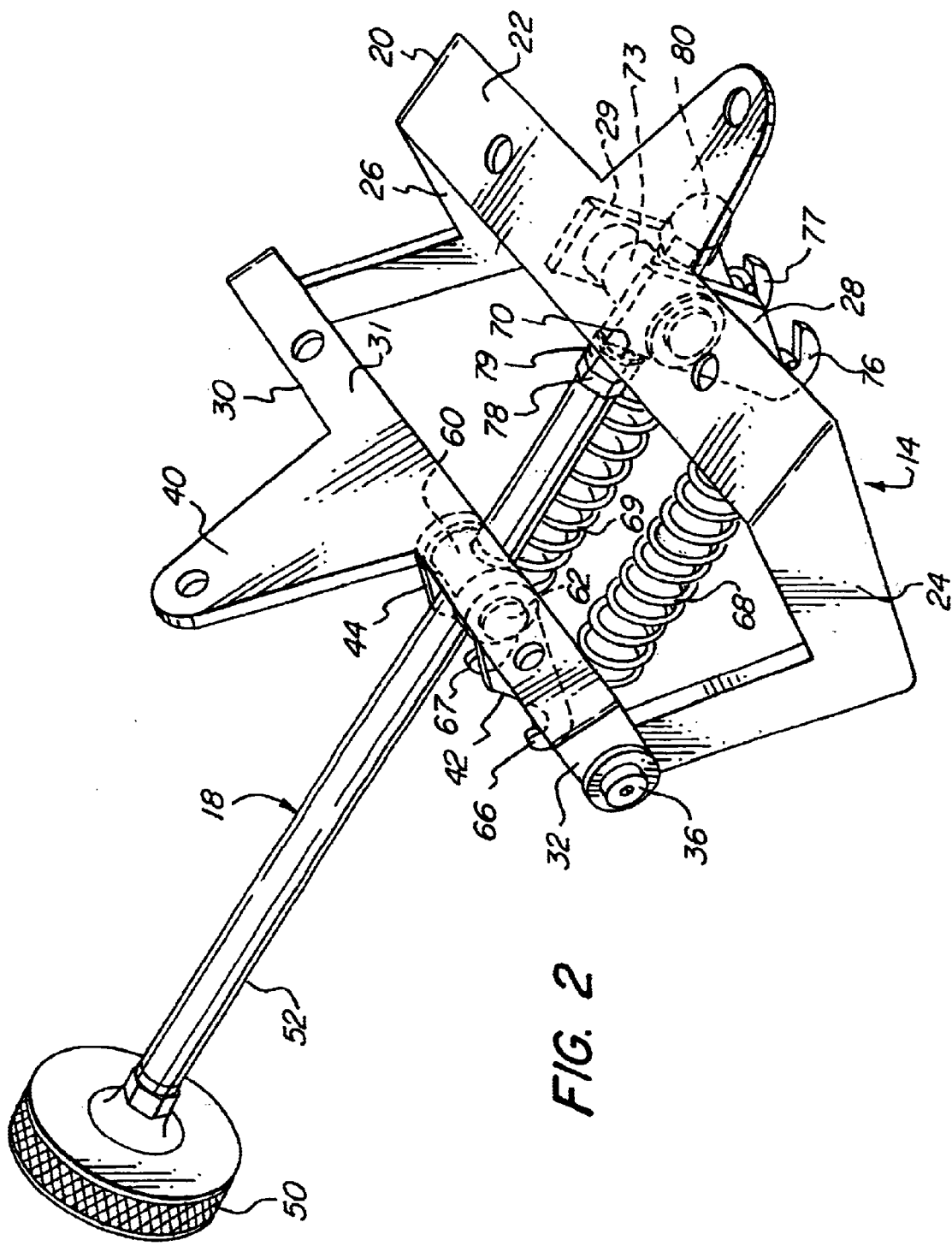
FIG. 2 is a perspective view of the pivot and adjustment knob assemblies.

Turning now in detail to the pivot assembly 14, it includes a support bracket 20 which is fixedly mounted on the motorcycle frame 16, and a pivotable bracket 30 which pivotably supports the fairing body 12. As is shown in FIGS. 1 and 2, the support bracket 20 includes a support plate 22 which is mounted on the motorcycle frame 16 and has support arms 24, 26 extending rearwardly and upwardly from its opposite horizontal ends. Lower ears 28 and 29 extend downwardly and rearwardly from the central portion of the support plate 22 to connect with knob assembly 18 in a matter described below.

The pivotable bracket 30 includes a horizontally extending, inclined pivot plate 31 having a pair of rearwardly extending connecting arms 32 at opposite ends thereof. The connecting arms 32, (one of which is shown in FIGS. 1 and 2) are pivotally connected to support arms 24, 26 with pivot pins 36 in order to pivotally connect the support bracket 20 to the pivotable bracket 30. A central fairing support 40 connects to the central portion of the pivot plate 31 in a co-planar arrangement and extends upwardly from the upper edge of the pivot plate 31 in order to provide additional structural support to the lower section of the fairing body 12. The pivotable bracket 30 has rearwardly extending upper ears 42, 44 for supporting the knob assembly 18 in a manner described below.

Turning now in detail to the knob assembly 18, it includes a single manually rotatable knob 50 fixed to the upper end of an inclined rod 52. The knob 50, shown in FIGS. 1–2 and 4–6, is positioned in front of the driver, thereby enabling the driver to rotate it with one hand while he or she is seated on and operating the motorcycle. The rod 52 extends through a pair of apertures formed in the wall of a horizontally disposed sleeve 60 which is pivotably mounted between the upper ears 42, 44 of the pivotable bracket 30 by upper pivot pins 62. The upper ears 42, 44 have hooked lower ends 66, 67, respectively, to which the upper ends of springs 68,69 are engaged. The rod 52 has a threaded portion 70 which is engaged in a threaded bore 73 in the barrel 72 which is pivotably mounted between lower ears 28, 29 of the support bracket 20 by lower pivot pins 74, 75. The lower ears 28, 29 have hooked ends 76, 77, respectively, which engage the lower ends of the springs 68, 69.

Figure 3:
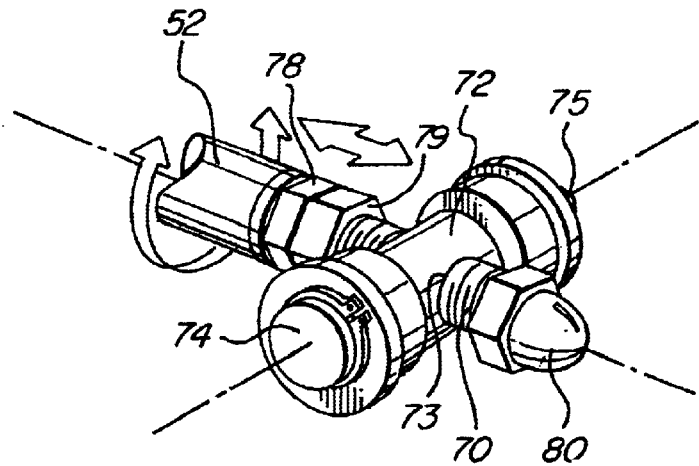
FIG. 3 is an enlarged fragmentary perspective view showing the threaded connection between the pivot and adjustment knob assemblies.
Figure 4:
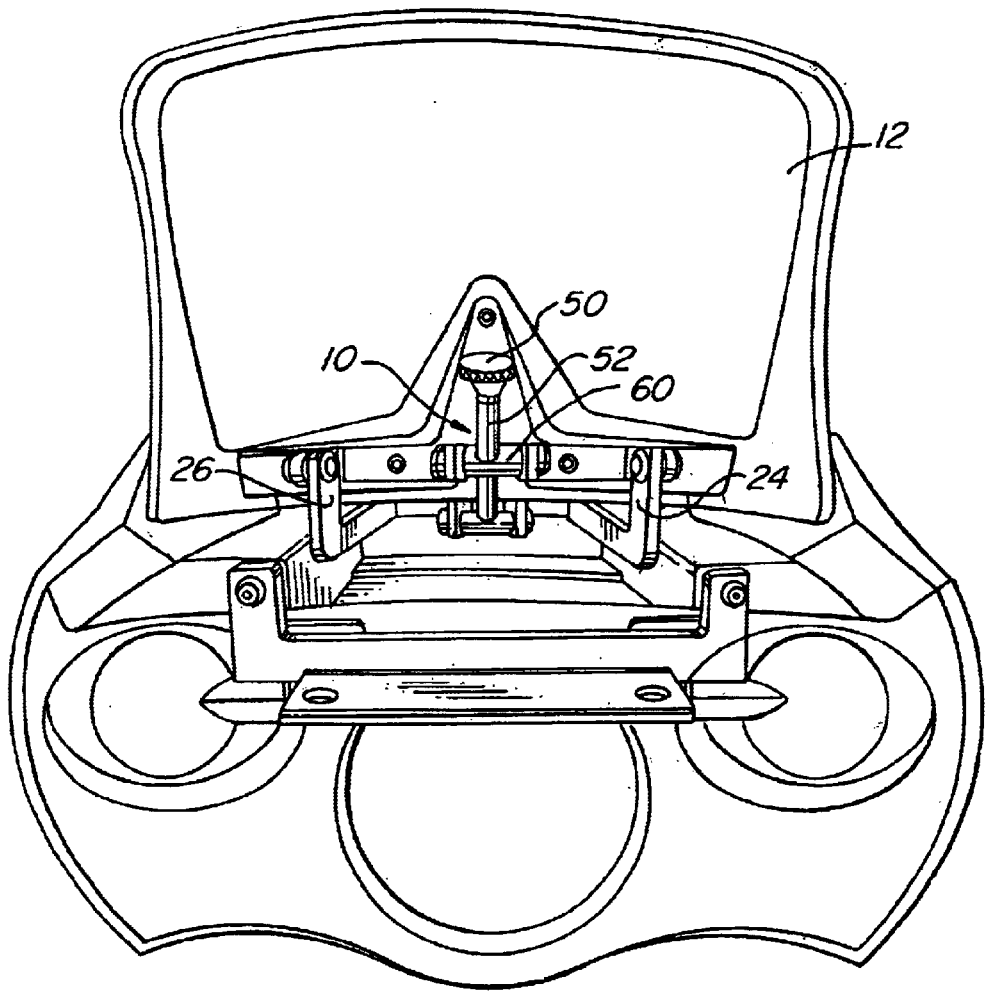
FIG. 4 is a rear elevational view of the fairing assembly as mounted on a fragmentarily illustrated motorcycle.
Figure 5:
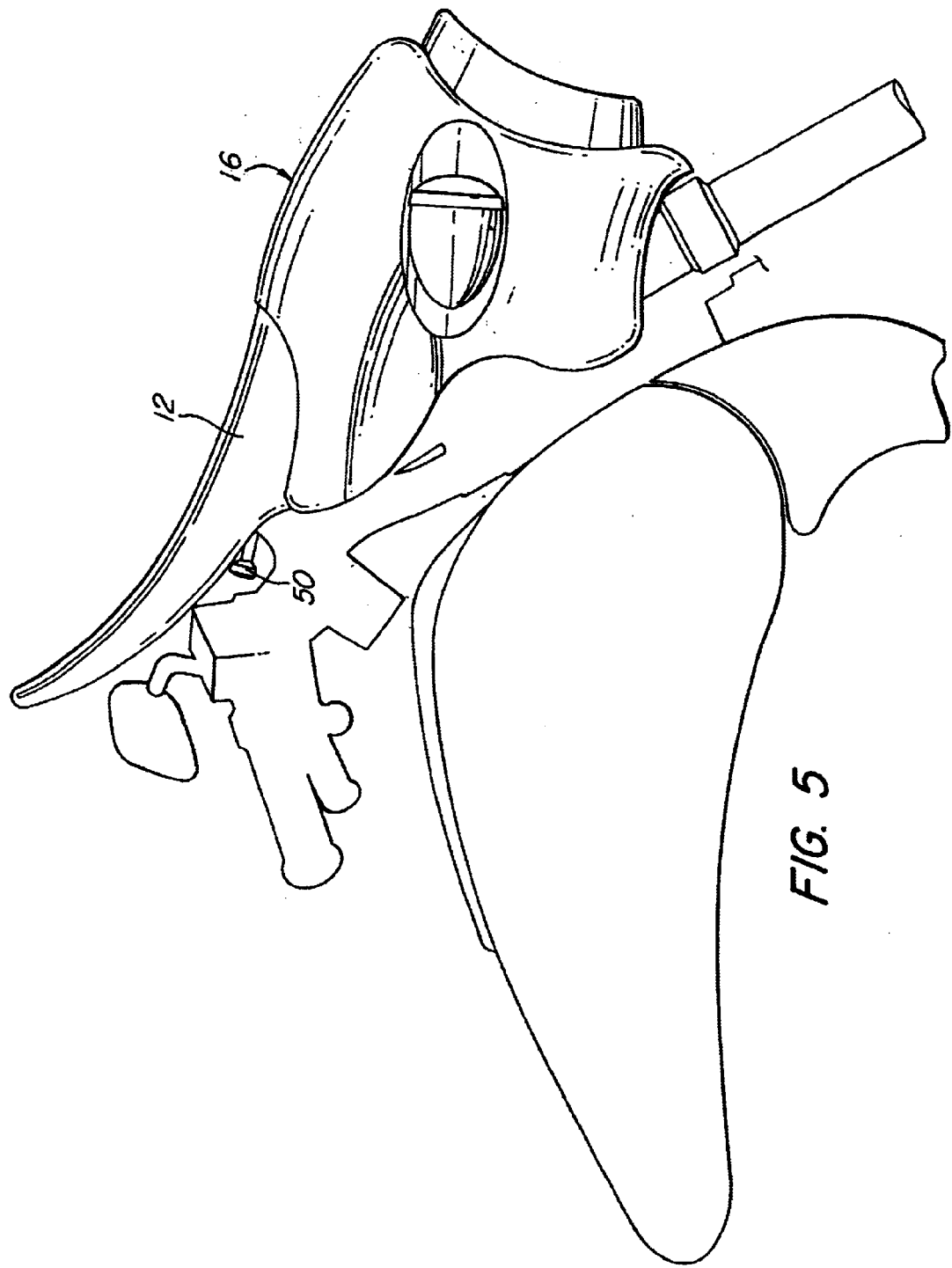
FIG. 5 is a fragmentary side elevational view of the motorcycle with the fairing shown in the lower operating position.
Figure 6:
FIG. 6 is a fragmentary side elevational view of the motorcycle with the fairing shown in an upper operating position.

In order to pivot the fairing body 12, the knob 50 is rotated clockwise or counterclockwise, causing the barrel 72 to move axially along the threaded portion 70 of rod 52, as is shown in FIG. 3. More specifically, when the fairing body 12 is in the lowest, most horizontal position, shown in FIG. 5 and in solid line in FIG. 1, the barrel 72 abuts a pair of fastening nuts 78, 79 that are disposed on the upper end of the threaded portion 70 of the rod 52. In order to pivot the fairing body upwardly, the knob 50 is rotated counterclockwise, causing the barrel 72 to move downwardly along the threaded portion 72 in a direction away from the knob 50 and the sleeve 60. As a result, the rod 52 pivots upwardly around an axis defined by barrel 72, causing the pivotable bracket 30 to pivot upwardly around an axis defined by the pivot pins 36. When the fairing body 12 is in its uppermost position, shown in FIG. 6 and in phantom line in FIG. 1, the barrel 72 abuts a threaded fastener 80 disposed on the terminal end of rod 52.

The springs 68, 69 provide added stability to the connection between the assembly 14 and the knob assembly 18.

In the illustrated embodiment, the upper edge 15 of the fairing body 12 curves vertically upwardly and forwardly, thereby directing air flow upwardly over the vehicle.

Thus, it can be seen from the foregoing detailed description and attached drawings that the fairing of the present invention can be conveniently adjusted manually by the driver, thereby allowing the driver to improve comfort as well as the efficiency of air flow over the vehicle as the direction and velocity of the wind changes during travel.

Having thus described the invention, what is claimed is:

1. An adjustable fairing for a motorcycle comprising:
    (a) a fairing body;
    (b) mounting means for mounting said fairing body on the motorcycle, said mounting means including a stationary support bracket adapted to be fixed to the motorcycle, and a pivotable bracket fixed to said fairing body and rotatably connected to said support bracket along a fixed axis, said pivotable bracket having first and second ears extending downwardly therefrom, (c) manually rotatable adjustment means operative on said mounting means for adjusting the angle of said pivotable bracket while the motorcycle is in operation, said adjustment means including rod means; and
    (d) sleeve means horizontally mounted between said first and second ears and having a wall with first and second apertures formed therein for seating said rod means therein, said sleeve means moving axially along said rod means when said adjustment means is rotated.

2. The fairing in accordance with claim 1 wherein said adjustment means comprises a rotatable knob.

3. The fairing in accordance with claim 1 wherein said pivotable bracket permits movement of said fairing body between an upper operating position and a lower operating position.

4. The fairing in accordance with claim 3 wherein said manually rotatable adjustment means permits orientation of said fairing body in any desired position between said upper operating position and said lower operating position.

5. The fairing in accordance with claim 1 wherein said fairing body has a generally arcuate cross section both vertically and horizontally.

6. The fairing in accordance with claim 5 wherein an upper edge of said fairing body curves upwardly at an upper end.

7. The fairing in accordance with claim 1 wherein said support bracket includes third and fourth ears extending downwardly therefrom, said rod means includes a threaded portion, and said adjustment means further includes barrel means mounted between said third and fourth ears and having a threaded aperture therethrough configured to receive said threaded portion of said rod means.

8. The fairing in accordance with claim 7, wherein said adjustment means further includes first spring means connecting said first ear to said third ear and second spring means connecting said second ear to said fourth ear.

9. In combination with a motorcycle having a frame, a driver's seat thereon and a handlebar, an adjustable fairing comprising:
    (a) a fairing body;
    (b) mounting means mounting said fairing body on said frame forwardly of said handlebar, said mounting means including a stationary support bracket fixed on said motorcycle frame, and a pivotable bracket fixed to said fairing body and rotatably connected to said support bracket along a fixed axis, said pivotable bracket having first and second ears extending downwardly therefrom;
    (c) manually rotatable adjustment means operative on said mounting means to pivot said fairing body to adjust the angle of said pivotable bracket relative to said frame while the motorcycle is in operation, said adjustment means including rod means; and
    (d) sleeve means horizontally mounted between said first and second ears and having a wall with first and second apertures formed and scaling said rod means therein, said sleeve means moving axially along said rod means when said adjustment means is rotated.

10. The fairing in accordance with claim 9 wherein said manually rotatable adjustment means further comprises a rotatable knob connected to the rod means.

11. The fairing in accordance with claim 9 wherein said pivotable bracket permits movement of said fairing body between an upper operating position and a lower operating position.

12. The fairing in accordance with claim 9 wherein said fairing body has a generally arcuate cross section vertically and horizontally.

13. The fairing in accordance with claim 12 wherein an upper edge of said fairing body curves upwardly at an upper end.

14. The fairing in accordance with claim 9 wherein said support bracket includes third and fourth ears extending downwardly therefrom, said rod means includes a threaded portion, and said adjustment means further includes barrel means mounted between said third and fourth ears and having a threaded aperture therethrough configured to receive said threaded portion of said rod means.

15. The fairing in accordance with claim 14, wherein said adjustment means further includes first spring means connecting said first ear to said third ear and second spring means connecting said second ear to said fourth ear.

\* \* \* \* \*